(12) United States Patent
Lu et al.

(10) Patent No.: US 11,587,746 B2
(45) Date of Patent: Feb. 21, 2023

(54) KEYBOARD WITH ANTENNA AND SENSOR

(71) Applicants: LITE-ON ELECTRONICS (GUANGZHOU) LIMITED, Guangzhou (CN); Lite-On Technology Corporation, Taipei (TW)

(72) Inventors: Ta-Ching Lu, Taipei (TW); Wu-Jeng Li, Taipei (TW); Chin-Ping Chan, Taipei (TW); Chih-Jen Kuo, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/878,592

(22) Filed: May 19, 2020

(65) Prior Publication Data

US 2020/0373108 A1 Nov. 26, 2020

Related U.S. Application Data

(60) Provisional application No. 62/849,961, filed on May 20, 2019.

(30) Foreign Application Priority Data

May 12, 2020 (CN) .......................... 202010396841.4

(51) Int. Cl.
*H01H 13/84* (2006.01)
*H01H 3/12* (2006.01)
(Continued)

(52) U.S. Cl.
CPC .......... *H01H 13/84* (2013.01); *G02B 6/0028* (2013.01); *G02B 6/0055* (2013.01); *H01H 3/125* (2013.01);
(Continued)

(58) Field of Classification Search
CPC ........ H01H 13/84; H01H 13/83; H01H 3/125; H01H 2219/044; H01H 2219/06;
(Continued)

(56) References Cited

U.S. PATENT DOCUMENTS 9,087,662 B2 * 7/2015 Chen ...................... G06F 3/0231
9,412,536 B2 * 8/2016 Chen ...................... H01H 13/83
(Continued)

FOREIGN PATENT DOCUMENTS

CN 103324244 9/2013
CN 204464132 7/2015

OTHER PUBLICATIONS

Office Action of China Counterpart Application, dated Nov. 10, 2021, pp. 1-7.

*Primary Examiner* — Lheiren Mae A Caroc
(74) *Attorney, Agent, or Firm* — JCIPRNET

(57) ABSTRACT

A keyboard including a substrate and a key structure is provided. The key structure is disposed on the substrate and includes a keycap, an antenna, and a sensor. The keycap is disposed on the substrate, and a length of the keycap is greater than a width of the keycap. The antenna is disposed on a back surface of the keycap facing toward the substrate. The sensor is disposed below the keycap and is electrically connected with the antenna.

18 Claims, 7 Drawing Sheets

(51) Int. Cl.
  *F21V 8/00* (2006.01)
  *H01H 13/83* (2006.01)
  *H01H 13/705* (2006.01)

(52) U.S. Cl.
  CPC ........... *H01H 13/83* (2013.01); *H01H 13/705* (2013.01); *H01H 2219/044* (2013.01); *H01H 2219/06* (2013.01); *H01H 2219/0621* (2013.01); *H01H 2239/004* (2013.01)

(58) Field of Classification Search
  CPC ......... H01H 2219/0621; H01H 13/705; H01H 2239/004; H01H 13/14; H01H 13/20; H01H 13/70; H01H 3/122; H01H 13/7065; G02B 6/0028; G02B 6/0055; G06F 1/3215; G06F 1/3271; G06F 3/0202; G06F 3/02; G06F 3/023
  See application file for complete search history.

(56) References Cited

U.S. PATENT DOCUMENTS

| | | | |
|---|---|---|---|
| 9,983,689 B2* | 5/2018 | Ikeda | H01H 13/70 |
| 11,029,843 B2* | 6/2021 | Forlines | G06F 3/0426 |
| 2009/0251384 A1 | 10/2009 | Ligtenberg et al. | |
| 2010/0328113 A1* | 12/2010 | Henry | G06F 21/86 |
| | | | 341/24 |
| 2012/0146817 A1* | 6/2012 | Tang | G06F 3/0202 |
| | | | 341/22 |
| 2015/0021151 A1* | 1/2015 | Chen | H01H 13/83 |
| | | | 200/5 A |
| 2019/0237279 A1* | 8/2019 | Hu | H01H 13/83 |

* cited by examiner

KEYBOARD WITH ANTENNA AND SENSOR

CROSS-REFERENCE TO RELATED APPLICATION

This application claims the priority benefit of U.S. provisional application Ser. No. 62/849,961, filed on May 20, 2019, and China application serial no. 202010396841.4, filed on May 12, 2020. The entirety of each of the above-mentioned patent applications is hereby incorporated by reference herein and made a part of this specification.

BACKGROUND OF THE INVENTION

1. Field of the Invention

The invention relates to a keyboard, and particularly relates to a keyboard having a sensor.

2. Description of Related Art

With the development of technology, many portable information devices have been developed, such as laptop computers, mobile phones, or personal digital assistants, and users utilize a keyboard, mouse, and other input devices to communicate with the electronic devices.

SUMMARY OF THE INVENTION

The invention provides a keyboard capable of executing a specific function according to a sensing result of a sensor.

According to an embodiment of the invention, a keyboard includes a substrate and a key structure. The key structure is disposed on the substrate and includes a keycap, an antenna, and a sensor. The keycap is disposed on the substrate, and a length of the keycap is greater than a width of the keycap. The antenna is disposed on a back surface of the keycap facing toward the substrate. The sensor is disposed below the keycap and is electrically connected with the antenna.

According to an embodiment of the invention, the sensor includes a proximity sensor, and when the proximity sensor is conducted, the antenna serves as a sensing antenna of the proximity sensor.

According to an embodiment of the invention, the keyboard further includes an electronic assembly electrically connected with the sensor. The sensor converts an operation mode of the electronic assembly in response to a change sensed by the antenna.

According to an embodiment of the invention, the substrate includes a main circuit board and a base plate, the base plate is disposed on the main circuit board, the key structure is disposed on the base plate, and the sensor and the electronic assembly are electrically connected with the main circuit board and are respectively disposed on opposite sides of the main circuit board.

According to an embodiment of the invention, the sensor is disposed on the substrate and electrically connected with the antenna, and the sensor and the antenna are respectively located on opposite sides of the substrate.

According to an embodiment of the invention, the antenna is a connection member of the keycap, the connection member is disposed along a length direction of the keycap, and another end of the connection member is connected with the keycap.

According to an embodiment of the invention, the antenna is a reinforcing member of the keycap, and the reinforcing member includes a rod-like or plate-like metal structure fixed on the back surface of the keycap.

According to an embodiment of the invention, the keyboard further includes a sensing circuit board disposed on the back surface of the keycap and electrically connected with the substrate. The sensor is disposed on the sensing circuit board, and the antenna is a conductive pattern on the sensing circuit board.

According to an embodiment of the invention, a keyboard includes a substrate and a key structure. The substrate includes a main circuit board and a base plate disposed on the main circuit board. The key structure is disposed on the base plate and includes a keycap, a sensor, a connection member, and an antenna. The keycap is disposed on the substrate. The sensor is disposed on and electrically connected with the main circuit board. The connection member is movably disposed between the base plate and the keycap. The keycap moves relative to the base plate by using the connection member, and the connection member is electrically connected with the sensor.

According to an embodiment of the invention, the keyboard further includes an electronic assembly electrically connected with the sensor and electrically connected with the main circuit board, respectively.

According to an embodiment of the invention, the key structure further includes a reinforcing member fixed to the back surface of the keycap. A length of the keycap is greater than a width of the keycap, and the reinforcing member is located in a relatively central region of the keycap.

According to an embodiment of the invention, a keyboard includes a substrate and a key structure. The key structure is disposed on the substrate and includes a keycap, a sensing circuit board, a proximity sensor, and an antenna. The keycap is disposed on the substrate, and a length of the keycap is greater than a width of the keycap. The sensing circuit board is disposed on a back surface of the keycap facing toward the substrate, electrically connected with the substrate, and includes a sensor electrically connected to an antenna disposed on the back surface of the keycap.

According to an embodiment of the invention, the keyboard further includes an electronic assembly electrically connected with the sensor. The electronic assembly and the sensor are disposed on opposite sides of the substrate.

According to an embodiment of the invention, the antenna is a conductive pattern on the sensing circuit board, and the sensor includes a proximity sensor.

According to an embodiment of the invention, the key structure further includes a connection member movably disposed between the substrate and the keycap, and the connection member is electrically connected with the sensor.

According to an embodiment of the invention, the key structure further includes a reinforcing member disposed on the back surface of the keycap and electrically connected with the sensor.

Based on the above, in the embodiments of the invention, the antenna is disposed on the back surface of the key structure in which the length of the keycap of the key structure is greater than the width of the keycap of the key structure, and the antenna is electrically connected with the sensor, so as to serve as the sensing antenna of the sensor. With such configuration, in the embodiments of the invention, the key structure having a greater back surface space is used to dispose the antenna of the sensor. Therefore, the keyboard is capable of automatically converting the operation state of the specific electronic assembly according to whether the sensed object enters the sensing area. Accordingly, the operation of the electronic device becomes more flexible, and the power consumption is reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
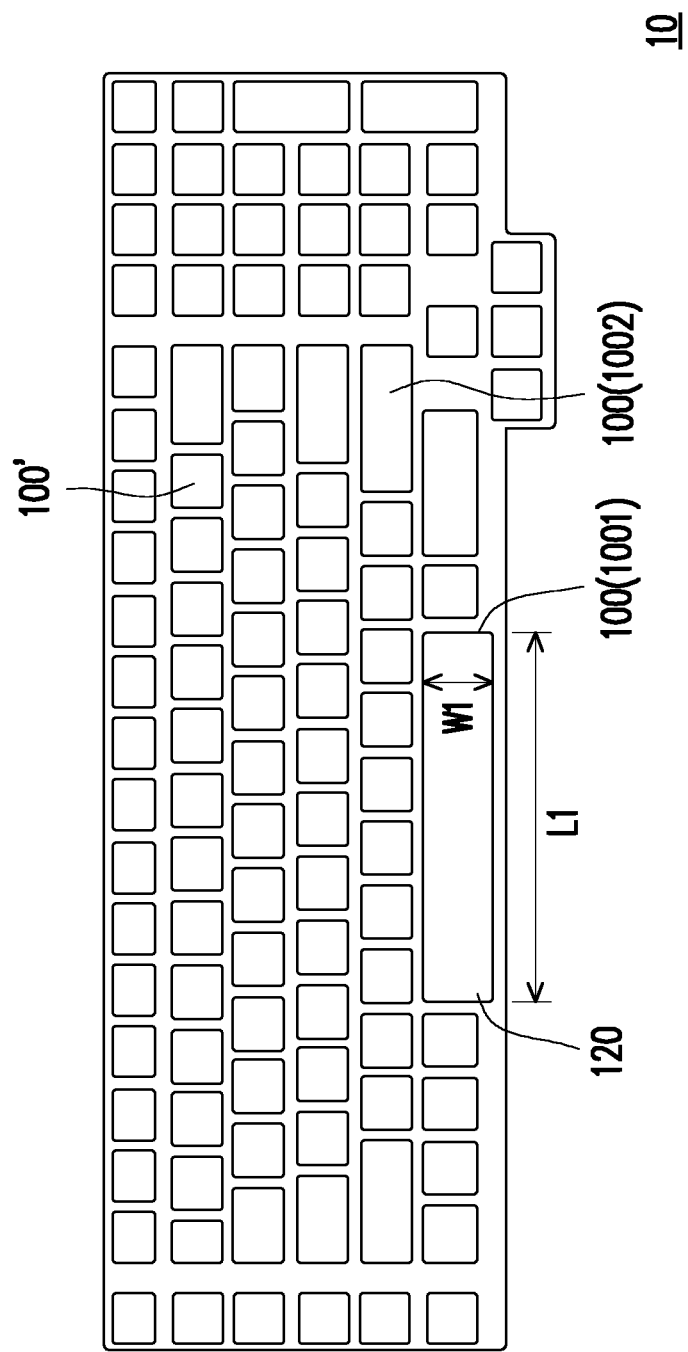
FIG. 1 is a schematic top view illustrating a keyboard according to an embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

Figure 2:
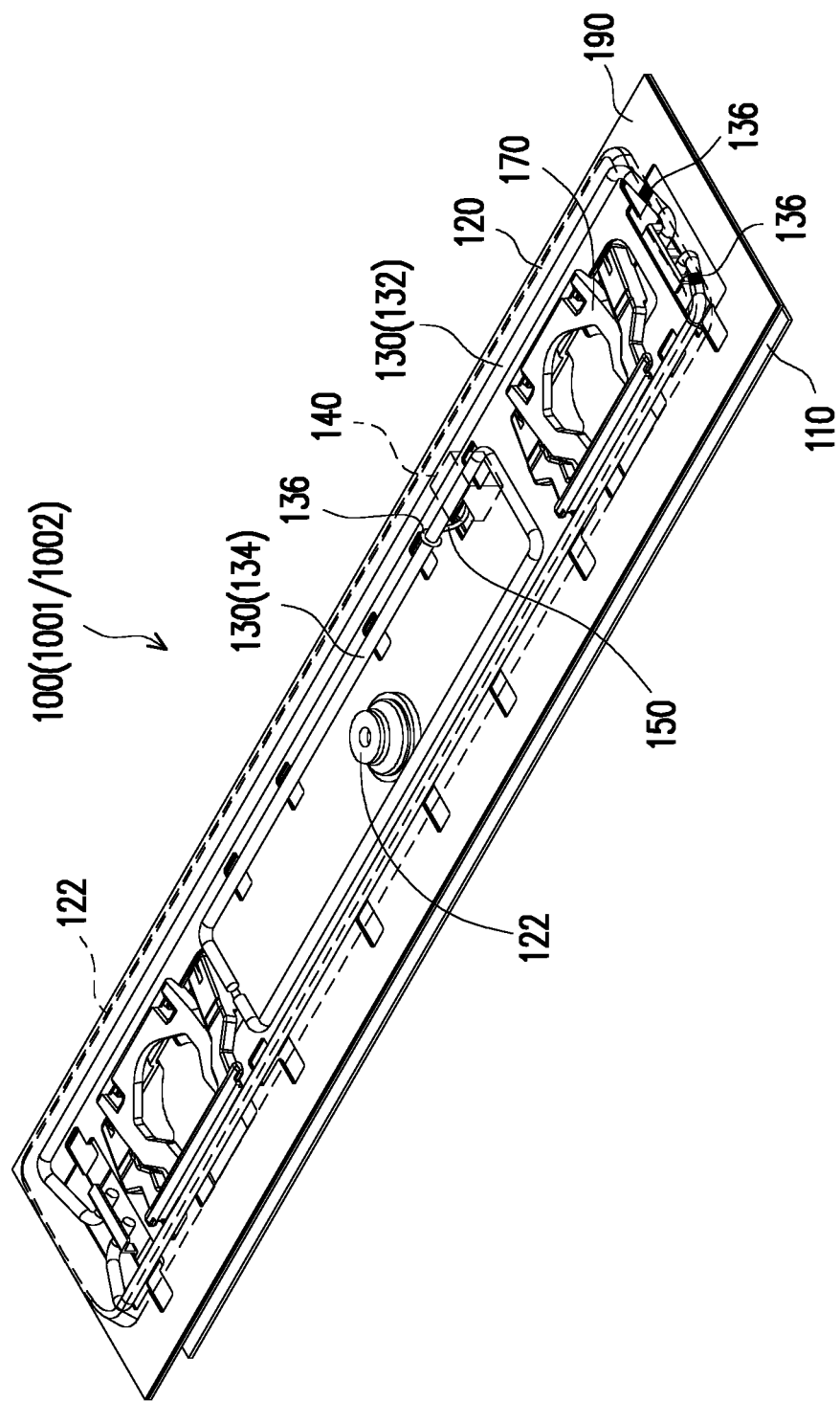
FIG. 2 is a schematic view illustrating a keyboard according to an embodiment of the invention.
Figure 3:
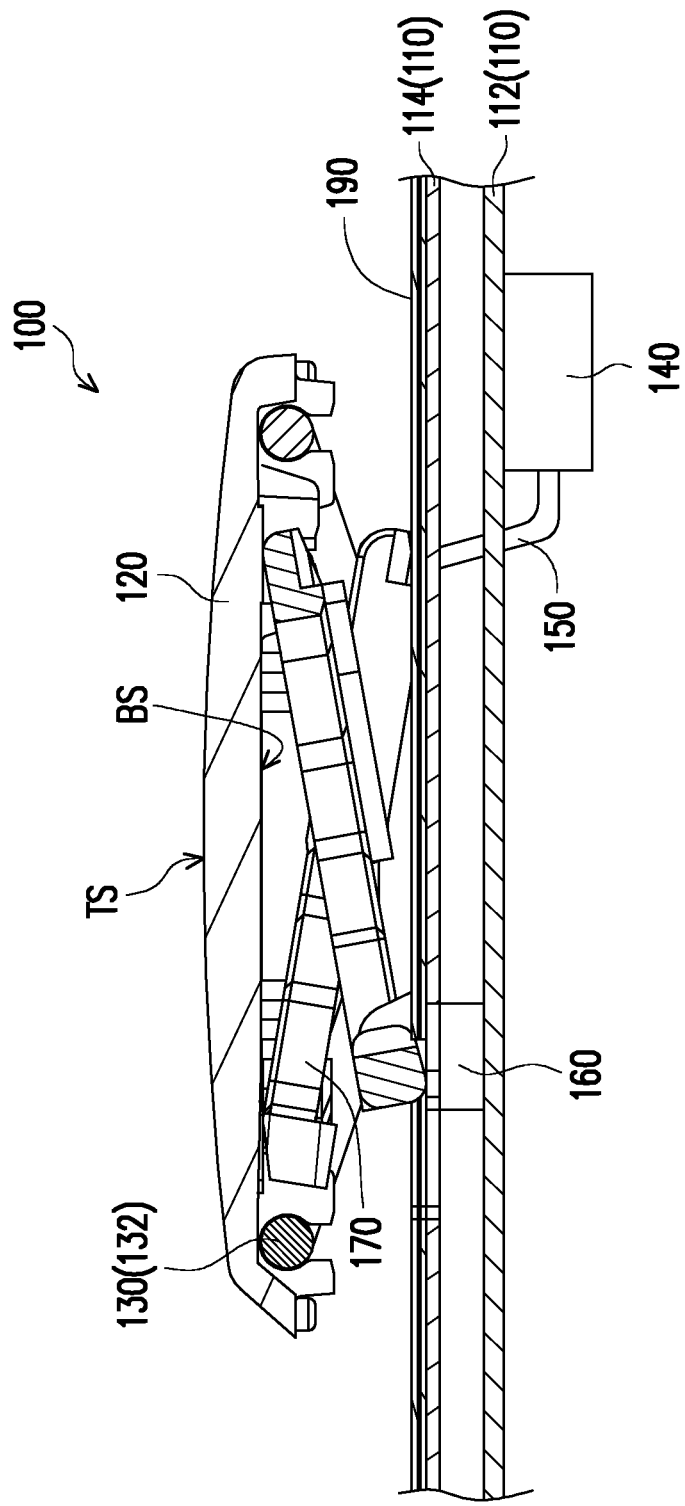
FIG. 3 is a schematic partial cross-sectional view illustrating a keyboard according to an embodiment of the invention.

FIG. 1 is a schematic top view illustrating a keyboard according to an embodiment of the invention. FIG. 2 is a schematic view illustrating a keyboard according to an embodiment of the invention. FIG. 3 is a schematic partial cross-sectional view illustrating a keyboard according to an embodiment of the invention. Referring to FIGS. 1 to 3, in an exemplary embodiment of the invention, a keyboard 10 includes a substrate 110 and a key structure 100 disposed on the substrate 110. In the embodiment, the key structure 100 may include a keycap 120, an antenna 130, and a sensor 140. In general, the keyboard 10 may include a plurality of key structures 100 and 100'. The keyboard structure 100' is classified as a normal-sized key (also known as a standard key), whereas the key structure 100 is classified as a key greater in length (also known as a multiple-width key). In some embodiments, the length of the key structure 100 is substantially greater than the width of the key structure 100. More specifically, the keycap 120 of the key structure 100 is disposed on the substrate 100, and a length L1 of the keycap 120 is substantially greater than a width W1 of the keycap 120. In some embodiments, the length of the keycap of the key structure 100' is substantially the same as the width of the keycap of the key structure 100'. In other words, a length-to-width ratio of the keycap of the key structure 100 is greater than a length-to-width ratio of the keycap the key structure 100'.

The key structures 100 and 100' are provided for the user to press with a finger to generate a corresponding signal to a computer, so that the computer may execute a function corresponding to the pressed key. In general, by pressing the key structure 100', a symbol (such as an English letter), or a numeral may be input or a specific function (e.g., F1 to F12, DEL, etc.) may be executed, and by pressing the key structure 100, a specific function (e.g., Space, Caps Lock, Shift, Enter, etc.) may be executed. In the embodiment, the key structure 100 may be a space bar, for example. However, the invention is not limited thereto. In other embodiments, the key structure 100 may also be another multiple-width key such as Shift or Enter. In the embodiment, the keyboard 10 may be a keyboard for a laptop computer. However, the invention is not limited thereto. In some embodiments, the keyboard 10 may be coupled to a controller, such as a computer, a terminal, a console (e.g., a gaming console). The controller may execute a program or be connected to a service provider, such as a server, a network, or the Internet, so as to execute or provide a program to a device.

As shown in FIGS. 2 and 3, the substrate 110 may include a main circuit board 112 of the keyboard 10 to receive and transmit signals corresponding to the input functions the keys (keyboard matrix signals) which various keys (e.g., the key structure 100 and the key structure 100') trigger. The substrate 110 may also control an operation mode of a specific electronic assembly. In some embodiments, the substrate 110 may further include a base plate 114. The base plate 114 may, for example, be disposed above the main circuit board 112 to provide mechanical support to the main circuit board 112 and the entire key structures. In some embodiments, the key structures 100 and 100' are disposed on the base plate 114, and the sensor 140 and the electronic assembly may be disposed below the base plate 114. The base plate 114 may be a metal plate (e.g., a stainless steel plate, a galvanized steel plate, an aluminum plate, or an Al—Mg alloy plate). However, the embodiment is not limited thereto. In another embodiment, the base plate 114 may also be made of a non-metal plate material (e.g., a plastic plate, a carbon fiber plate, or a glass fiber plate) or a composite material plate formed by bonding metal and non-metal materials, so as to prevent the metal base plate from interfering the sensing of the antenna. The composite base plate is, for example, formed by firstly performing a surface treatment on a metal material to facilitate the activity level and the bonding force and then integrating the metal material with a non-metal material by injection molding.

In the embodiment, the keyboard 10 may be a membrane keyboard, and the keyboard structures 100 and 100' further include a membrane circuit layer 190, a trigger member 122, and a connector 170 disposed between the keycap 120 and the base plate 114. The membrane circuit layer 190 is located on the base plate 114, and has a switch corresponding to each key. The trigger member 122 is disposed between the keycap 120 and the membrane circuit layer 190 in correspondence with the switch of each key. The connector 170 is, for example, a scissor-type mechanism, and the two ends of the connector 170 are respectively movably connected with the keycap 120 and the base plate 114, so as to assist the keycap 120 to move upward and downward with respect to the base plate 110. When the keycap 120 is pressed, the trigger member 122 receives a force and moves downward to press against the switch of the membrane circuit layer 190, so as to generate a trigger signal and input a command. Once the force applied to the keycap 120 is removed, the trigger member 122 or the connector 170 may drive the keycap 120 to return to the original position. In some embodiments, the keyboard 10 further includes an electronic assembly 160. The electronic assembly 160 is, for example, disposed on the main circuit board 112 and located below the base plate 114, and may be electrically connected with the sensor 140 via the main circuit board 112.

Referring to FIGS. 1 to 3, in the key structure 100, the antenna 130 is disposed on a back surface BS of the keycap 120 facing toward the substrate 110. A top surface TS of the keycap 120 opposite to the bottom surface BS is provided for the user to press to execute a corresponding function of the pressed keycap 120. The sensor 140 is disposed on the substrate 110 and located below the keycap 120, and is electrically connected with the antenna 130. In the embodiment, the sensor 140 may be disposed below the main circuit board 112 and electrically connected with the main circuit board 112. In other words, the sensor 140 and the electronic assembly 160 may be respectively disposed on the opposite (upper and lower) sides of the main circuit board 112 and electrically connected with the main circuit board 112. The sensor 140 includes a proximity sensor, and the antenna 130 is electrically connected with the proximity sensor 140. In such a structural configuration, when the proximity sensor 140 is conducted, the antenna 130 forms a sensing field to serve as a sensing antenna of the proximity sensor 140.

Specifically, when a sensed object (e.g., the user's hand) approaches the sensing field, the sensing field may change. A signal processing unit of the sensor 140 thus determines that the sensed object is within a sensing distance according to the change of the sensing field and outputs a sensing signal. In some embodiments, the electronic assembly 160 electrically connected with the sensor 140 may be a light emitting assembly, a wireless assembly, an ID identification assembly, or a circuit with a specific function (e.g., a wake-up circuit or a start circuit) of the keyboard 10. In such a structural configuration, when the sensed object enters the sensing field, the signal processing unit of the sensor 140 may output a sensing signal in correspondence with the change of the sensing field, so as to convert the operation mode of the electronic assembly or the circuit with a specific function.

Taking the case where the light emitting assembly (electronic assembly 160) is electrically connected with the sensor 140 as an example, the light emitting assembly is disposed below the key structure 100 to provide a light source, so that a light beam can be emitted from the back surface of the key structure 100 to provide indication or demonstrate diversified visual effects. When the signal processing unit outputs the sensing signal, the control unit (not shown) of the keyboard 10 may drive the light emitting assembly (electronic assembly 160) to emit light according to the sensing signal, so as to turn on the light emitting function of the keyboard 10. In addition, when the sensed object moves away from the sensing field formed by the antenna 130 to exit the sensing distance, the sensor 140 may also sense the change of the sensing field and notify the control unit of the keyboard 10 to stop driving the light emitting assembly (electronic assembly 160) and thereby turn off the light emitting function of the keyboard 10. Accordingly, the keyboard 10 is capable of turning on or off the light emitting function according to whether the sensed object enters the sensing distance. Of course, the embodiment merely serves as an example and the embodiment is not limited thereto. In other embodiments, the keyboard 10 may convert the operation mode of any applicable electronic assembly according to the sensing signal, such as turning on a wireless assembly or an ID identification assembly. In other embodiments, the control unit of the keyboard 10 may further transmit a command to a power wakeup circuit of the electronic device (e.g., a desktop computer or a laptop computer) connected with the keyboard 10 according to the sensing signal, so that the electronic device may exit a hibernate mode or a sleep mode.

In some embodiments, the keyboard 10 may also be provided with multiple sensors 140 that respectively correspond to different key structures 100. In other words, the keyboard 10 may include a plurality of key structures 100 (such as a key structure 1001 and a key structure 1002 shown in FIG. 1). As an example, the key structure 1001 may be a space bar, and the key structure 1002 may be an Enter key or other multiple-width keys. Accordingly, the antennas 130 of the key structures 1001 and 1002 may respectively form the corresponding sensing fields and may be respectively connected with the corresponding sensors 140. In such a structural configuration, the two or more sensors 140 may cooperate with each other to generate more different commands, so as to convert among a greater number of different operation modes of any applicable electronic assembly.

For example, when the sensed object (e.g., the user's right hand) approaches the sensing field generated by the key structure 1001 and then remains still, while another sensed object (e.g., the user's left hand) approaches the key structure 1002 and then moves (e.g., waving his/her left hand), the electrical fields generated by the antennas 130 of the key structure 1001 and the key structure 1002 are respectively changed. Accordingly, the sensors 140 of the key structure 1001 and the key structure 1002 may respectively output the corresponding sensing signals according to the changes of the corresponding sensing fields (e.g., the sensor 140 of the key structure 1001 outputs the first sensing signal and the sensor 140 of the key structure 1002 outputs the second sensing signal). Accordingly, the control unit of the keyboard 10 receives the sensing signals (e.g., the first sensing signal and the second sensing signal) to convert the operation modes of the specific electronic assemblies, such as adjusting the sound volume, adjusting the brightness of the screen, switching the input methods, etc. It should be noted that the embodiment is not limited thereto. In some embodiments, the keyboard 10 may include a microcontroller disposed on the main circuit board 112 and electrically connected with the main circuit board 112. In addition to receiving the sensing signal output by the sensor 140 to convert the operation mode of the specific electronic assembly (e.g., adjusting the sound volume, adjusting the brightness of the screen, switching the input methods, etc), the microcontroller may also serve to control a lighting effect, a keyboard matrix, etc.

Referring to FIGS. 2 to 3, in some embodiments, the sensor 140 is disposed on the substrate 110 and electrically connected with the antenna 130. In the embodiment, the sensor 140 and the antenna 130 are respectively located on opposite sides of the substrate 110. The sensor 140, as shown in FIG. 3, may be disposed on the lower surface of the substrate 110 distant from the keycap 120, and may be electrically connected with the antenna 130 located on the back surface of the keycap 120 via a conductive wire 150. The conductive wire 150 may penetrate through the substrate 110 (the main circuit board 112 and the base plate 114), so as to be electrically connected with the antenna 130 on the back surface of the keycap 120. In other embodiments, the sensor 140 may also be electrically connected to the upper surface of the substrate 110 through a conductive via of the substrate 110, and thus be electrically connected with the antenna 130 via the conductive wire 150 or via the connector 170. The embodiment does not intend to impose a limitation on the electrical connection of the sensor 140.

Referring to FIG. 2, in the embodiment, the antenna 130 may include a connection member 132 of the keycap 120. The connection member 132 is disposed between the substrate 110 and the keycap 120 and along the length direction of the keycap 120. In addition, one end of the connection member 132 is connected with the substrate 110 and the other end of the connection member 132 is connected with the keycap 120. Since the length of the keycap 120 of the key structure 100 is greater than the width of the keycap 120, the keycap 120 may easily wobble when the user presses the keycap 120, which affects the operation of the key structure 100 and the pressing feedback of the user. Moreover, if the keycap 120 is pressed eccentrically, the press stroke of the key structure 100 may be insufficient to conduct the circuit, so the specific function cannot be executed. Accordingly, the connection member 132 is arranged to extend along the length direction of the keycap 120. By doing so, the lateral drivability of the keycap 120 can be facilitated, and the wobbling that occurs as the keycap 120 moves can be alleviated. As a result, the keycap 120 can be operated more smoothly. The connection member 132 may be movably disposed between the base plate 114 and the back surface BS of the keycap 120. One end of the connection member 132 is pivoted to the base plate 114 of the substrate 110, and the other end thereof is pivoted to the keycap 120. Accordingly, the connection member 132 is able to convey the pressing force (load) of the user from one end of the keycap 120 to the other end through a torque, thereby stabilizing the keycap 120 in the length direction. In other words, the connection member 132 may transmit a torque or a load from the end of the keycap 120 to the center.

In the embodiment, the connection member 132 includes a metal rod arranged on the back surface BS of the keycap 120, and may also serve as the antenna 130 of the sensor 140. In other words, the connection member 132 disposed on the back surface of the keycap 120 may be electrically connected with the sensor 140 to form the sensing field of the sensor 140. In some embodiments, the connection member 132 may include at least one feeder 136. The conductive wire 150 may penetrate through the substrate 110 (the main circuit board 112 and the base plate 114) and be connected to the feeder 136, so that the antenna 130 (the connection member 132) on the back surface BS of the keycap 120 is electrically connected with the sensor 140. Therefore, in the embodiment, the connection member 132 of the key structure 100 in which the length of the keycap is greater than the width of the keycap is used as the antenna 130 of the sensor 140. The keyboard 10 is capable of automatically converting the operation state of the specific electronic assembly (e.g., turning on or off the light emitting function) according to whether the sensed object enters the sensing area. Accordingly, the operation of the electronic device becomes more flexible, and the power consumption is reduced. Besides, by using the connection member 132 extending along the length direction of the keycap 120 as the antenna 130, the sensing range is increased.

In some embodiments, the antenna 130 may also include a reinforcing member 134 on the keycap 120. The reinforcing member 134 is disposed on the back surface BS of the keycap 120. Since the length of the keycap 120 of the key structure 100 of the embodiment is greater than the width of the keycap 120, by disposing the reinforcing member 134 on the back surface BS of the keycap 120, the key structure 100 may be provided with additional support and mechanical stability. The reinforcing member 134 is, for example, a rod-like or a plate-like metal structure fixed to a relatively central region of the keycap 120 and is not connected with the base plate 114 of the substrate 110. In other words, the location where the connection member 134 and the keycap 120 are connected is located on the outer side of the reinforcing member 134, so that the reinforcing member 134 may reinforce the strength of the central region of the keycap 120 and reduce the deformation when the keycap 120 is pressed. In the embodiment, the reinforcing member 134 may also serve as the antenna 130 of the sensor 140. In other words, the reinforcing member 134 disposed on the back surface of the keycap 120 may be electrically connected with the sensor 140 to form the sensing field of the sensor 140, so as to automatically convert the operation state of the specific electronic assembly according to whether the sensed object enters the sensing region. Similarly, the reinforcing member 134 may include at least one feeder 136. The conductive wire 150 may penetrate through the substrate 110 (the main circuit board 112 and the base plate 114) and be connected to the feeder 136, so that the reinforcing member 134 on the back surface BS of the keycap 120 is electrically connected with the sensor 140. In some embodiments, the connection member 132 and the reinforcing member 134 of the keycap 120 both could serve as the antenna 130 of the sensor 140 (i.e., being electrically connected with the sensor 140 respectively), or only one of the connection member 132 and the reinforcing member 134 serves the antenna 130 of the sensor 140.

Figure 4:
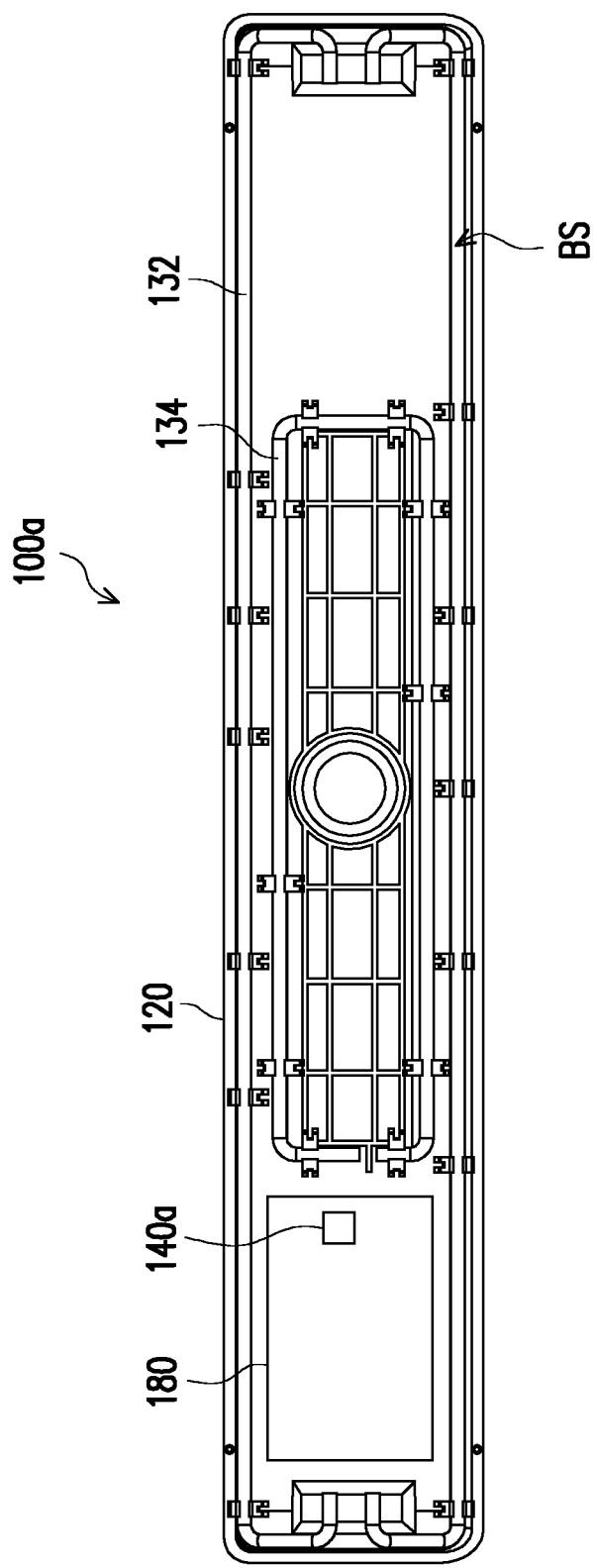
FIG. 4 is a schematic partial bottom view illustrating a keyboard according to an embodiment of the invention.
Figure 5A:
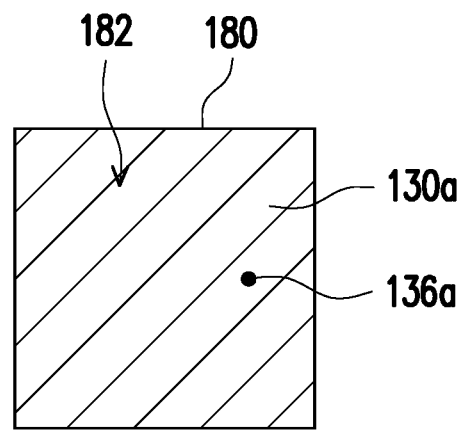
FIG. 5A is a schematic top view illustrating a sensing circuit board according to an embodiment of the invention.

FIG. 4 is a schematic partial bottom view illustrating a keyboard according to an embodiment of the invention. FIG. 5A is a schematic top view illustrating a sensing circuit board according to an embodiment of the invention.

Figure 5B:
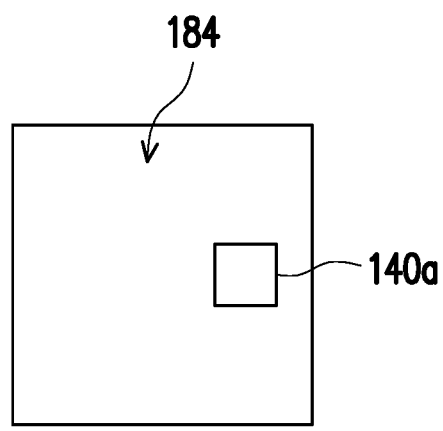
FIG. 5B is a schematic bottom view illustrating a sensing circuit board according to an embodiment of the invention.
Figure 6:
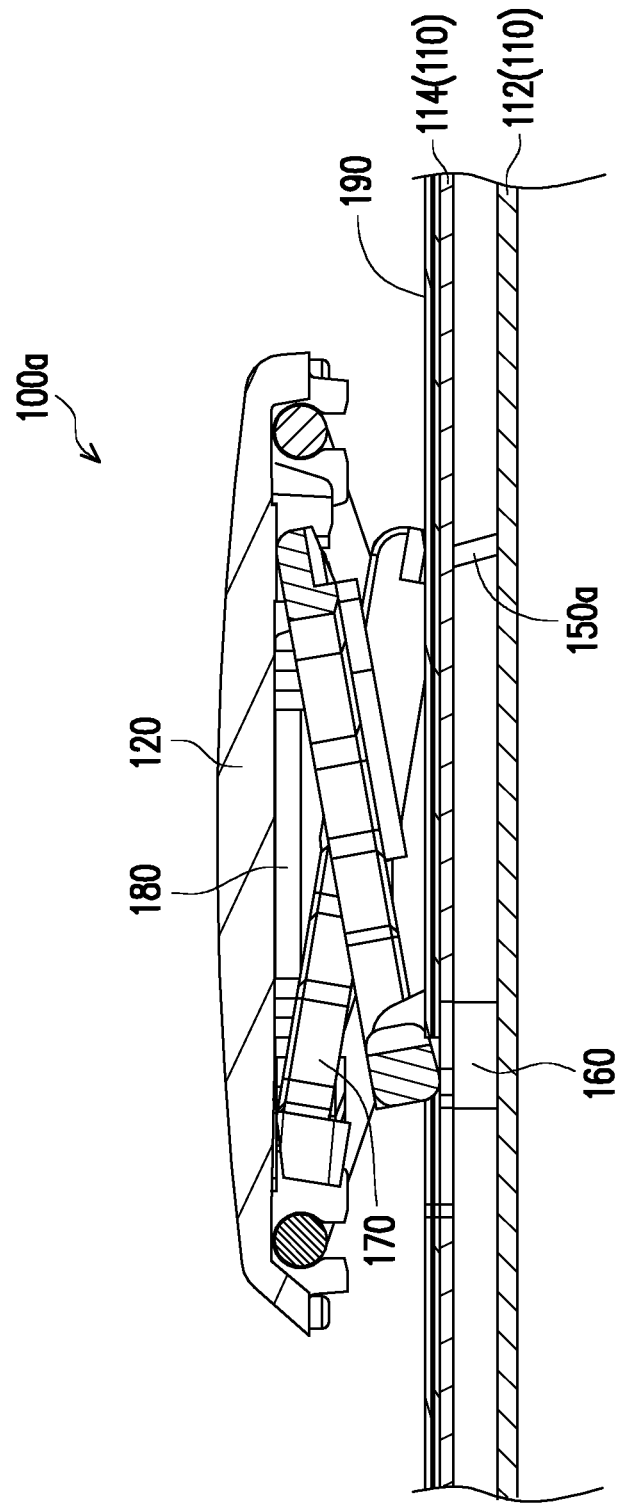
FIG. 6 is a schematic partial cross-sectional view illustrating a keyboard according to an embodiment of the invention.

FIG. 5B is a schematic bottom view illustrating a sensing circuit board according to an embodiment of the invention. FIG. 6 is a schematic partial cross-sectional view illustrating a keyboard according to an embodiment of the invention. It should be noted that a key structure 100a of the embodiment is similar to the key structure 100 of FIGS. 2 and 3. Therefore, the reference numerals and a part of the contents in the previous embodiment are used in the embodiment, the identical reference numerals indicate identical or similar components, and repeated description of the same technical contents is omitted. For a detailed description of the omitted parts, reference can be found in the previous embodiment, so such description will not be repeated in the embodiment. Referring to FIGS. 4 to 6, the following descriptions will focus on the difference between the key structure 100a of the embodiment and the key structure 100 shown in FIGS. 2 and 3.

Referring to FIGS. 4 to 6, in the embodiment, the key structure 100a further includes a sensing circuit board 180. The sensing circuit board 180 is disposed on the back surface BS of the keycap 120. In addition, a sensor 140a is electrically connected with and disposed on the sensing circuit board 180, and the sensing circuit board 180 is electrically connected with the main circuit board 112 of the substrate 110. In some embodiments, the sensing circuit board 180 may be disposed in an empty area between the connection member 132 and the reinforcing member 134. For example, the sensing circuit board 180 may be attached to the back surface BS of the keycap 120 and may be electrically connected with the main circuit board 112 of the substrate 110 via a conductive wire 150a. In the embodiment of FIG. 3, the sensor 140 is disposed on the main circuit board 112 and connected to the antenna 130 on the back surface BS of the keycap 120, so the conductive wire 150 in the embodiment of FIG. 3 is a signal line for transmitting signals. In the embodiments of FIGS. 4 to 6, the sensor 140*a* is disposed on the sensing circuit board 180 on the back surface BS of the keycap 120, so the conductive wire 150*a* of the embodiment should be a power wire. However, the embodiment is not limited thereto.

As shown in FIGS. 4 to 6, an antenna 130*a* may be a conductive pattern formed on the sensing circuit board 180. In other words, the antenna 130*a* (i.e., the portion marked with oblique lines in FIG. 5A) may be a circuit structure (e.g., a copper foil circuit or a sliver paste circuit) formed on or inside the sensing circuit board 180 or a solid pad formed on the surface of the sensing circuit board 180. It should be noted that, in the embodiment, the antenna 130*a* may be formed on an upper surface 182 of the sensing circuit board 180 attached to the back surface BS of the keycap 120, and may be electrically connected with the sensor 140*a* on a lower surface 184 by using a via (feeder 136*a*), etc. In other embodiments, the antenna 130*a* may also be formed on the lower surface 184 of the sensing circuit board 180 provided to dispose the sensor 140*a*. In other words, the antenna 130*a* and the sensor 140*a* may be disposed on the same surface of the sensing circuit board 180, and may also be respectively disposed on the opposite surfaces of the sensing circuit board 180. The embodiment does not intend to impose a limitation on this regard. In other embodiments, it may also be that the sensing circuit board 180 is not provided with the conductive pattern that serves as an antenna. By electrically connecting the sensor 140*a* disposed on the sensing circuit board 180 to the connection member 132 and/or the reinforcing member 134 on the back surface BS of the keycap 120, the connection member 132 and/or the reinforcing member 134 may serve as the antenna of the sensor 140*a*.

Figure 7:
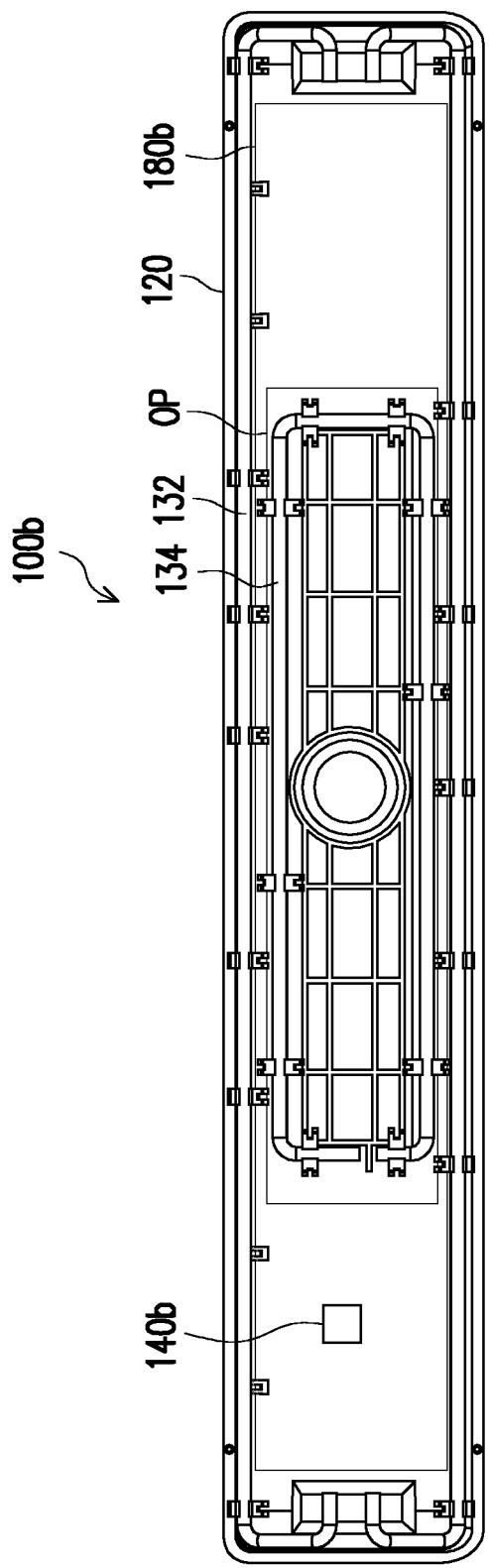
FIG. 7 is a schematic partial bottom view illustrating a keyboard according to an embodiment of the invention.

FIG. 7 is a schematic partial bottom view illustrating a keyboard according to an embodiment of the invention. It should be noted that a key structure 100*b* of the embodiment is similar to the key structure 100*a* of FIGS. 4 to 6. Therefore, the reference numerals and a part of the contents in the previous embodiment are used in the embodiment, the identical reference numerals indicate identical or similar components, and repeated description of the same technical contents is omitted. For a detailed description of the omitted parts, reference can be found in the previous embodiment, so such description will not be repeated in the embodiment. Referring to FIG. 7, the following descriptions will focus on the difference between the key structure 100*b* of the embodiment and the key structure 100*a* shown in FIGS. 4 to 6.

Referring to FIG. 7, in the embodiment, a sensing circuit board 180*b* may be disposed on the back surface BS of the keycap 120. In addition, a sensor 140*b* is electrically connected with and disposed on the sensing circuit board 180*b* that is electrically connected with the main circuit board 112 of the substrate 110. In the embodiment, the sensing circuit board 180*b* may substantially cover the back surface BS of the keycap 120, and a corresponding opening OP may be formed on the sensing circuit board 180*b*, so as to give space to the connection member 132 and/or the reinforcing member 134 that may be structurally interfered with the sensing circuit board 180*b*. In another embodiment, the opening OP may not be formed in the sensing circuit board 180*b* at the location corresponding to the reinforcing member 134. In other words, the majority of the back surface BS of the keycap 120 is covered by the sensing circuit board 180*b*, so as to, in place of the reinforcing member 134, facilitate the structural strength of the central region of the keycap 120.

The sensing circuit board 180*b* may be attached to the back surface BS of the keycap 120 and may be electrically connected with the main circuit board 112 of the substrate 110 via a conductive wire. Similar to the embodiment shown in FIG. 5A and FIG. 5B, the antenna of the sensor 140*b* may be formed as a conductive pattern on the sensing circuit board 180*b*. The antenna and the sensor 140*b* may be disposed on the same surface of the sensing circuit board 180*b* or disposed on opposite surfaces of the sensing circuit board 180*b* and then establishing electrical connection through a via, for example. The embodiment does not intend to impose a limitation on this regard. In other embodiments, it may also be that the sensor 140*b* is electrically connected with the connection member 132 and/or the reinforcing member 134 on the back surface BS of the keycap 120 to use the connection member 132 and/or the reinforcing member 134 as the antenna 130 of the sensor 140*b*.

The sensor 140*a* and the sensor 140*b* of the key structure 100*a* and the key structure 100*b* may operate independently to convert the operation mode of the assembly or circuit with a specific function according to the change of the sensing field. In some embodiments, the number of the sensors and the number of the antennas may respectively be plural. The sensors are respectively electrically connected with the corresponding antennas, and the sensors may cooperate with each other. In such a structural configuration, the two or more sensors may cooperate with each other to generate a greater number of different commands, so as to convert among a greater number of different operation modes of any applicable electronic assembly. The embodiment does not intend to impose a limitation on this regard.

In view of the foregoing, in the embodiments of the invention, the antenna is disposed on the back surface of the key structure in which the length of the keycap of the key structure is greater than the width of the keycap of the key structure, and the antenna is electrically connected with the sensor, so as to serve as the sensing antenna of the sensor. With the configuration, such key structure (the length of the keycap being greater than the width of the keycap) is provided with a greater back space to dispose the antenna of the sensor. Therefore, the keyboard is capable of automatically converting the operation state of the specific electronic assembly (e.g., turning on or off the light emitting function) according to whether the sensed object enters the sensing area. Accordingly, the operation of the electronic device becomes more flexible, and the power consumption is reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A keyboard, comprising:
    a substrate; and
    a key structure, disposed on the substrate and comprising:
        a keycap, disposed on the substrate;
        an antenna, disposed on a back surface of the keycap facing toward the substrate;
        a sensor, disposed below the keycap and electrically connected with the antenna, wherein the antenna is closer to a top surface of the keycap than the sensor is, and the top surface faces away from the substrate and is opposite to the back surface, wherein the sensor comprises a proximity sensor, and the antenna serves as a sensing antenna of the proximity sensor that is being conducted; and an electronic assembly, disposed below the keycap and electrically connected with the sensor, wherein the sensor converts an operation mode of the electronic assembly in response to a change sensed by the antenna.

2. The keyboard as claimed in claim 1, wherein the substrate comprises a main circuit board and a base plate, the base plate is disposed on the main circuit board, the key structure is disposed on the base plate, and the sensor and the electronic assembly are electrically connected with the main circuit board and are respectively disposed on opposite sides of the main circuit board.

3. The keyboard as claimed in claim 1, wherein the sensor is disposed on the substrate and electrically connected with the antenna, and the sensor and the antenna are respectively located on opposite sides of the substrate.

4. The keyboard as claimed in claim 1, wherein the antenna is a connection member of the keycap, the connection member is disposed along a length direction of the keycap, an end of the connection member is connected with the substrate, and another end of the connection member is connected with the keycap.

5. The keyboard as claimed in claim 1, wherein the antenna is a reinforcing member of the keycap, and the reinforcing member comprises a rod-like or plate-like metal structure fixed on the back surface of the keycap.

6. The keyboard as claimed in claim 1, further comprising a sensing circuit board disposed on the back surface of the keycap and electrically connected with the substrate, wherein the sensor is disposed on the sensing circuit board, and the antenna is a conductive pattern on the sensing circuit board.

7. A keyboard, comprising:
a substrate, comprising a main circuit board and a base plate disposed on the main circuit board; and
a key structure, disposed on the substrate and comprising:
a keycap, disposed on the base plate;
a sensor, disposed on and electrically connected with the main circuit board; and
a connection member, movably disposed between the base plate and the keycap, wherein the keycap moves relative to the base plate by using the connection member, and the connection member is electrically connected with the sensor.

8. The keyboard as claimed in claim 7, further comprising an electronic assembly electrically connected with the sensor and electrically connected with the main circuit board, respectively.

9. The keyboard as claimed in claim 7, wherein the key structure further comprises a reinforcing member fixed to the back surface of the keycap, wherein a length of the keycap is greater than a width of the keycap, and the reinforcing member is located in a relatively central region of the keycap.

10. A keyboard, comprising:
a substrate; and
a key structure, disposed on the substrate and comprising:
a keycap, disposed on the substrate, wherein a length of the keycap is greater than a width of the keycap;
a sensing circuit board, disposed on a back surface of the keycap facing toward the substrate, wherein the sensing circuit board is electrically connected with the substrate, and comprises a sensor electrically connected to an antenna disposed on the back surface of the keycap, wherein the antenna is closer to a top surface of the keycap than the sensor is, and the top surface faces away from the substrate and is opposite to the back surface; and
an electronic assembly, disposed below the keycap and electrically connected with the sensor, wherein the sensor converts an operation mode of the electronic assembly in response to a change sensed by the antenna.

11. The keyboard as claimed in claim 10, further comprising an electronic assembly electrically connected with the sensor, wherein the electronic assembly and the sensor are respectively disposed on opposite sides of the substrate.

12. The keyboard as claimed in claim 10, wherein the antenna is a conductive pattern on the sensing circuit board, and the sensor comprises a proximity sensor.

13. The keyboard as claimed in claim 10, wherein the key structure further comprises a connection member movably disposed between the substrate and the keycap, and the connection member is electrically connected with the sensor.

14. The keyboard as claimed in claim 10, wherein the key structure further comprises a reinforcing member disposed on the back surface of the keycap and electrically connected with the sensor.

15. A keyboard, comprising: a substrate; and a key structure, disposed on the substrate and comprising: a keycap, disposed on the substrate, wherein the keycap has a top surface and a back surface facing the substrate; an antenna, disposed on the keycap; a sensor, disposed below the keycap and electrically connected with the substrate, wherein the sensor and the antenna are respectively located on opposite sides of the substrate, and the antenna is closer to the top surface of the keycap than the sensor is; and an electronic assembly, disposed below the keycap and electrically connected with the substrate.

16. The keyboard as claimed in claim 15, wherein the antenna serves as a sensing antenna of the sensor, and the sensor converts an operation mode of the electronic assembly in response to a change sensed by the antenna.

17. The keyboard as claimed in claim 15, further comprising a connector disposed between the keycap and the substrate, wherein the substrate comprises a circuit board and a base, two ends of the connector are respectively connected with the keycap and the base, and the sensor and the electronic assembly are respectively coupled to the circuit board.

18. The keyboard as claimed in claim 15, wherein the sensor and the electronic assembly are disposed on opposite sides of the substrate.

* * * * *